United States Patent
Zhang et al.

[11] Patent Number: 5,862,661
[45] Date of Patent: Jan. 26, 1999

[54] METHOD FOR MONITORING CATALYTIC CONVERTER EFFICIENCY

[75] Inventors: Hong Zhang; Alexander Ketterer, both of Regensburg, Germany

[73] Assignee: Siemens Aktiengesellschaft, Munich, Germany

[21] Appl. No.: 903,999

[22] Filed: Jul. 31, 1997

[30] Foreign Application Priority Data

Jul. 31, 1996 [DE] Germany .................. 196 30 940.9

[51] Int. Cl.⁶ .............................. F01N 3/18; F01N 3/20
[52] U.S. Cl. .............................. 60/274; 60/276; 60/277; 73/118.1
[58] Field of Search ................. 60/274, 276, 277, 60/285; 73/118.1

[56] References Cited

U.S. PATENT DOCUMENTS

| | | | |
|---|---|---|---|
| 5,203,165 | 4/1993 | Wild et al. | 60/274 |
| 5,209,060 | 5/1993 | Hirschmann et al. | 60/274 |
| 5,303,548 | 4/1994 | Shimizu et al. | 60/277 |
| 5,317,868 | 6/1994 | Blischke et al. | 60/274 |
| 5,363,647 | 11/1994 | Ohuchi et al. | 60/276 |
| 5,377,484 | 1/1995 | Shimizu | 60/276 |
| 5,379,587 | 1/1995 | Toyoda | 60/277 X |
| 5,400,592 | 3/1995 | Mukaihira et al. | 60/274 |
| 5,743,086 | 4/1998 | Nagai | 60/276 |

FOREIGN PATENT DOCUMENTS

| | | |
|---|---|---|
| 0444783 | 9/1991 | European Pat. Off. . |
| 4024211 | 2/1992 | Germany . |
| 4024213 | 2/1992 | Germany . |
| 4211116 | 10/1993 | Germany . |

*Primary Examiner*—Tony M. Argenbright
*Attorney, Agent, or Firm*—Herbert L. Lerner; Laurence A. Greenberg

[57] ABSTRACT

The catalytic converter of an internal combustion engine is monitored with regard to its conversion capacity. A sensor downstream of the catalytic converter measures the oxygen concentration in the exhaust gas leaving the catalytic converter. A mean value is determined of the oxygen concentration measurement signal, and the area between the measurement signal and the mean value is calculated. The area is then compared with a predetermined comparison value, and a low conversion capacity of the catalytic converter is deduced from the comparison if the area is greater than the comparison value. A corresponding error signal may be stored in memory or immediately output as a warning for the driver of the vehicle.

11 Claims, 2 Drawing Sheets

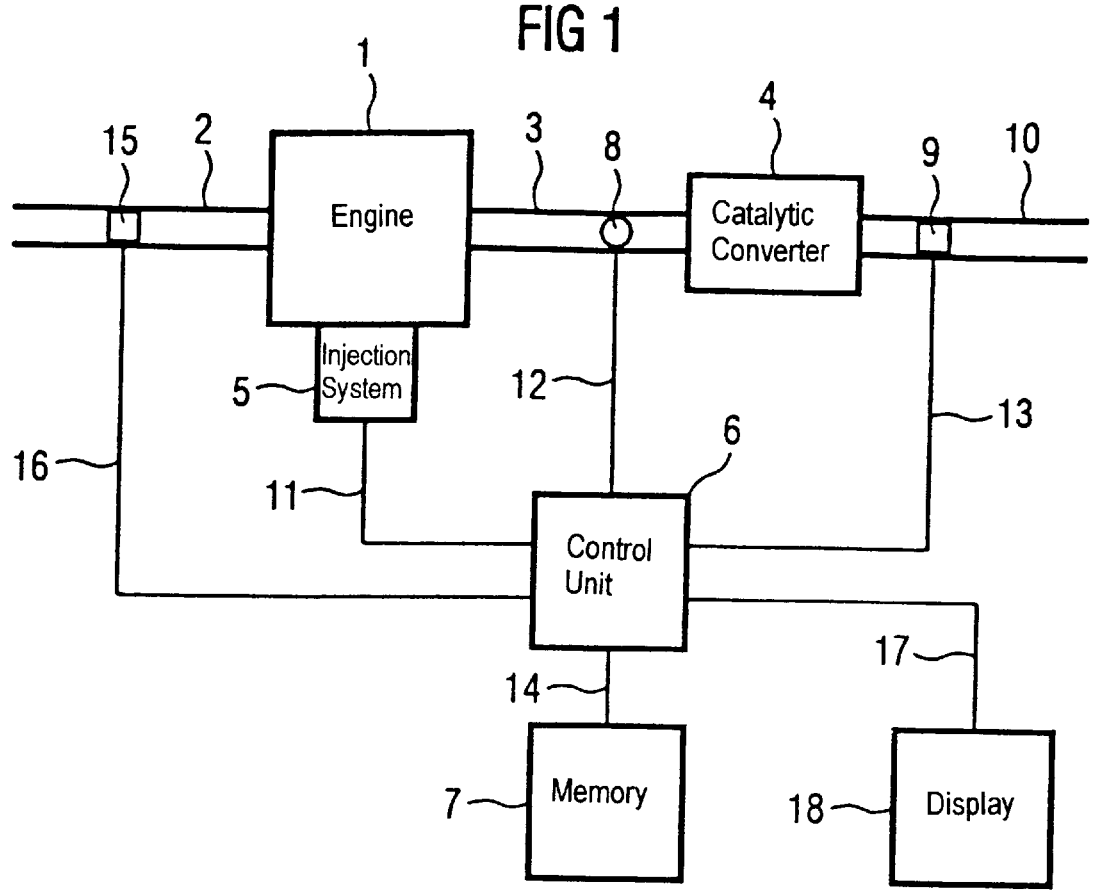

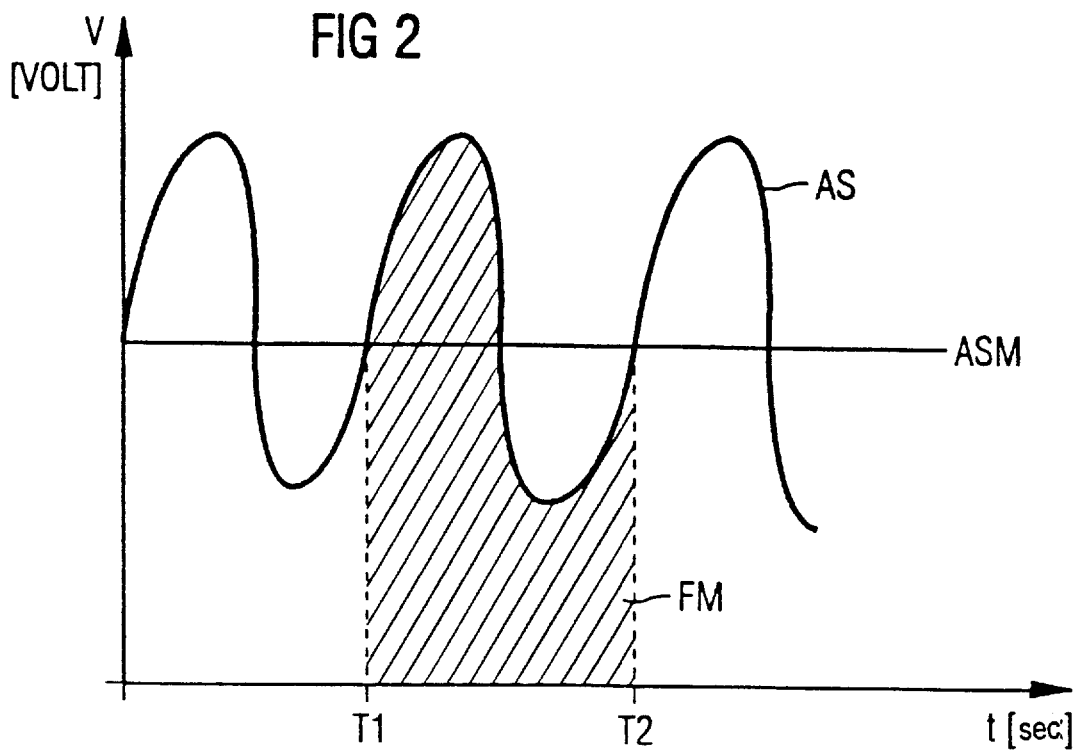
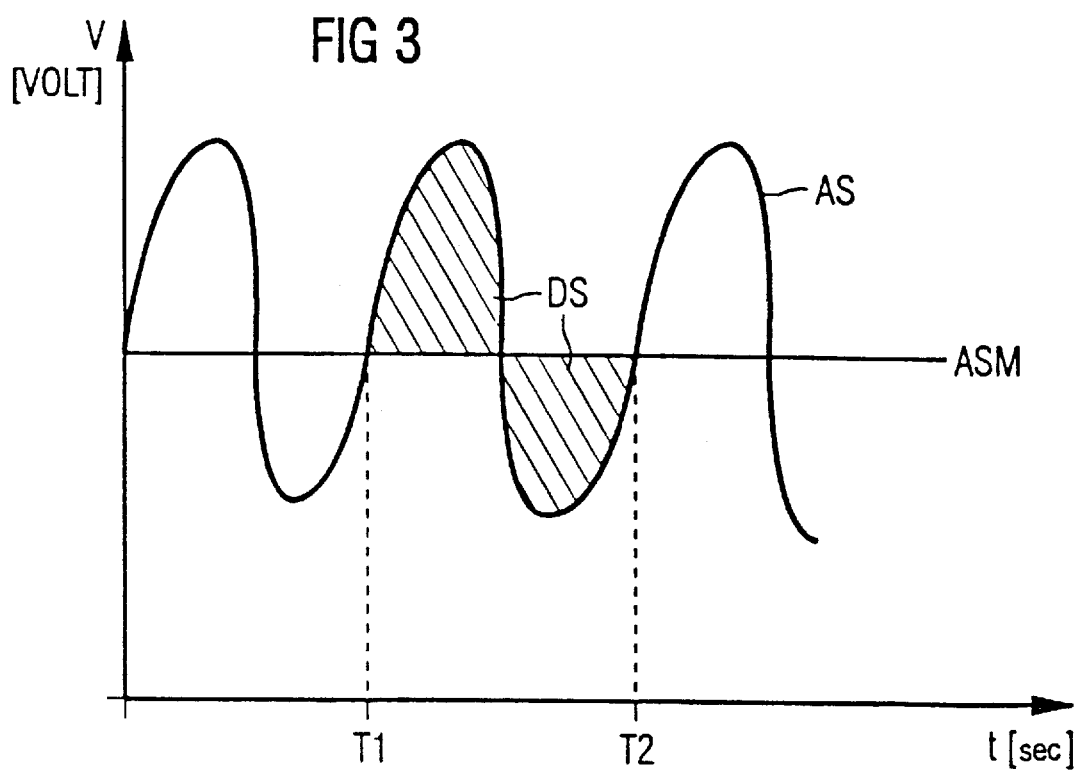

METHOD FOR MONITORING CATALYTIC CONVERTER EFFICIENCY

BACKGROUND OF THE INVENTION

1. Field of the Invention

Catalytic converters are used to clean the exhaust gases of internal combustion engines. The efficiency of the catalytic converter determines the quality of the exhaust gas. Aging and poisoning, however, lessens the conversion capacity of the catalytic converter.

To meet legal limit values, it is necessary to ascertain the efficiency of the catalytic converter on an ongoing basis and to output a signal if the efficiency and hence the conversion capacity of the catalytic converter drops below a predetermined threshold, the result of which is that the exhaust gas leaving the catalytic converter does not meet the legal requirements.

2. Description of the Related Art

There has become known heretofore from European patent disclosure EP 0 444 783 A1 a method for monitoring the conversion capacity of the catalytic converter, in which an oxy g e n sensor that measures the oxygen concentration in the exhaust gas is provided at the outlet of the catalytic converter. In lambda control, the air/fuel ratio delivered to the engine is adjusted so that it oscillates around the lambda value of 1. In accordance with the lambda control, the oxygen sensor measures an oscillating oxygen concentration at the outlet of the catalytic converter. The difference between the maximum and minimum values of the oscillating oxygen concentration is used as a criterion for the conversion capacity of the catalytic converter, which is greater the less the distance between the maximum value and the minimum value.

That prior art method is relatively imprecise.

SUMMARY OF THE INVENTION

It is accordingly an object of the invention to provide a method of monitoring the conversion efficiency of a catalytic converter, which overcomes the above-mentioned disadvantages of the heretofore-known devices and methods of this general type and which is improved in terms of its precision and dependability.

With the foregoing and other objects in view there is provided, in accordance with the invention, a method of monitoring a conversion capacity of a catalytic converter of an internal combustion engine, the engine having lambda-controlled injection, the method which comprises:

measuring an oxygen content in an exhaust gas downstream of the catalytic converter and issuing a measurement signal;

determining a mean value of the measurement signal for a predetermined time period;

calculating a measure for an area bounded by the mean value of the measurement signal and by the measurement signal during the predetermined time period;

comparing the measure for the area with a comparison value and deducing a poor conversion capacity of the catalytic converter if the measure is above a comparison value; and issuing a corresponding signal if a poor conversion capacity of the catalytic converter is found in the deducing step.

In accordance with an added feature of the invention, the method further comprises dividing the measure for the area by the time period for calculating a comparison area, and wherein the comparing step comprises comparing the comparison area with a corresponding comparison value.

In accordance with an additional feature of the invention, the comparison area is averaged over a given number of time periods, and the comparing step comprises comparing the averaged comparison area with the comparison value.

In accordance with another feature of the invention, a most recent calculated mean value is presumed a correct mean value and a newly calculated mean value is accepted in the deducing step only if the newly calculated mean value deviates from the correct mean value by less than a predetermined value.

In accordance with a further feature of the invention, the method further comprises forming an exhaust gas quotient by dividing the comparison area by a corresponding comparison value, and forming a total exhaust gas quotient by summing the exhaust gas quotient for a predetermined number of time periods, and comparing the total exhaust gas quotient with a corresponding comparison value, and wherein the poor conversion capacity of the catalytic converter is deduced if the total exhaust gas quotient is greater than the corresponding comparison value.

In accordance with a further feature of the invention, the comparison value is defined as a function of the speed of the engine, and/or a load on the engine, and/or a temperature of the catalytic converter.

In accordance with again a further feature of the invention, the method is only performed if the mean value of the measurement signal is within a predetermined range of values.

With the above and other objects in view there is also provided, in accordance with the invention, an apparatus for assessing the conversion capacity of the catalytic converter, comprising:

an exhaust gas sensor disposed downstream of the catalytic converter in an exhaust gas flow direction, the exhaust gas sensor measuring an oxygen concentration in the exhaust gas and generating a measurement signal;

a control device receiving the measurement signal, the control device being programmed to:
calculate from the measurement signal a mean value of the measurement signal over a predetermined time period;
ascertain a measure for an area bounded by the mean value and by the measurement signal;
compare the measure for the area with a comparison value; and
deduce a low conversion capacity of the catalytic converter if the measure for the area is greater than the comparison value;

the control device issuing a signal indicating a low conversion capacity if a low conversion capacity has been deduced.

In accordance with again another feature of the invention, the control device is incorporated in the control unit for controlling the fuel injection of the engine.

In accordance with again an additional feature of the invention, the control device is programmed to average the measure for the area over a plurality of predetermined time periods, and to compare the averaged area with the comparison value.

In accordance with a concomitant feature of the invention, the control device is further programmed to calculate the measure for the area only if the mean value of the measurement signal deviates from a most recently evaluated mean value by no more than a predetermined amount.

In summary, by ascertaining the mean value of the oxygen concentration downstream of the catalytic converter and calculating the area bounded by the mean value and the oxygen concentration, a precise calculation of the conversion capacity of the catalytic converter is possible.

Other features which are considered as characteristic for the invention are set forth in the appended claims.

Although the invention is illustrated and described herein as embodied in a method for monitoring catalytic converter efficiency, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a schematic diagram illustrating an exhaust gas system with a catalytic converter and a control system;

FIG. 2 is a graph showing a measurement course for calculating the mean value; and FIG. 3 is a graph of a measurement course for calculating the catalytic converter efficiency.

DESCRIPTION OF THE PREFERRED EMBODIMENTS

Referring now to the figures of the drawing and first, particularly, to FIG. 1 thereof, there is shown an internal combustion engine 1. An intake tract 2 leads into the engine 1 and an exhaust tract 3 leads away from the engine 1. For the purpose of this description, the terms upstream and downstream will be taken with reference to the gas flow through the engine, with the intake tract 2 being disposed upstream and the exhaust tract 3 being disposed downstream of the engine 1. A catalytic converter 4 is disposed in the exhaust tract 3 and an exhaust pipe 10 issues downstream from the catalytic converter 4. An air mass or flow rate meter 15 is disposed in the intake tract 2 and communicates with a control unit 6 via a third measurement line 16. An injection system 5 of the engine 1 communicates with the control unit 6 via a control line 11.

A lambda sensor 8 is provided upstream of the catalytic converter 4 in the exhaust tract 3, and an exhaust gas sensor 9 is provided downstream of the catalytic converter 4 in the exhaust pipe 10. The exhaust gas sensor 9 is connected to the control unit 6 via a first measurement line 12. The exhaust gas sensor 9 is connected to the control unit via a second measurement line 13. The control unit 6 also communicates with a memory 7 via a data line 14 and with a display 18 via a control line 17.

The system illustrated in FIG. 1 functions as follows:

The air flow rate meter 15 measures the air mass aspirated by the engine 1 and informs the control unit 6 of the measured air mass. The control unit 6, from the measured air mass, ascertains a corresponding fuel quantity, which the injection system 6 delivers to the engine 1, so that upon combustion a proper stoichiometric ratio between air and fuel is established, which corresponds to a lambda value of 1.

The lambda sensor 8 detects the oxygen concentration in the exhaust gas output by the engine 1. If a lambda control is switched on, the output signal of the lambda sensor 8 assumes a virtually oscillating wave form. The oxygen concentration in the exhaust gas is delivered by the lambda sensor 8 to the control unit 6, which regulates the injection system 5 using the measured oxygen concentration in the exhaust gas.

The exhaust gas is delivered to the catalytic converter 4, which oxidizes such pollutants as carbon monoxide (CO) and hydrocarbons (HC). The storage capacity for oxygen in the catalytic converter 4 is a measure of the oxidation capacity and hence the conversion capacity of the catalytic converter 4.

The exhaust gas sensor 9 measures the oxygen concentration in the exhaust gas downstream of the catalytic converter 4 and sends a corresponding signal to the control unit 6. If the engine is in a quasi-steady state and the lambda control is active, then an oscillation of the oxygen concentration occurs in the exhaust gas upstream of the catalytic converter. A catalytic converter 4 with a high conversion capacity smooths out the fluctuations in the oxygen ratio in the exhaust gas, so that the exhaust gas sensor 9 then ascertains only a slight oscillation in the oxygen concentration. The measurement signal of the exhaust gas sensor 9 is used by the control unit 6 to assess the conversion capacity of the catalytic converter 4.

If a poor conversion capacity of the catalytic converter 4 occurs, then this is stored in the memory 7, for instance in an error memory, and/or a corresponding warning signal is issued via a display 18.

The evaluation of the exhaust gas measurement signal of the exhaust gas sensor 9 will now be described in further detail with reference to FIGS. 2 and 3. FIG. 2 shows the exhaust gas measurement signal AS, which is plotted in volts V over the time t in seconds. First, the measurement signal AS within one measurement period of the exhaust gas measurement signal is summed in the time period from T1 to T2 and then divided by the time period (T2-T1), which results in a mean exhaust gas value ASM. For instance, the exhaust gas measurement signal AS is sampled every 20 ms over the period between T1 and T2. Those samples are summed during the period from T1 to T2 to form an exhaust gas sum FM, which is then divided by the number a samples. The time period (T2-T1) advantageously corresponds to one control period of the lambda control.

The exhaust gas measurement signal ASM is described by the following formula:

$$ASM = \frac{FM}{T2 - T1}$$

where FM designates the exhaust gas sum, which represents the sum of the measured exhaust gas signals during the period T2-T1.

The exhaust gas measurement signal ASM is stored by the control unit 6 in the memory 7. FIG. 2 thus shows how the exhaust gas measurement signal ASM is ascertained, with the shaded area in FIG. 2 representing the exhaust gas sum FM.

For evaluating the conversion capacity of the catalytic converter 4, the area that is bounded by the exhaust gas signal and the mean exhaust gas value during one period of the exhaust gas signal AS in the time period from T1 to T2 is calculated. The bounded area will hereinafter be called the signal area FS. By way of example, the signal area FS is calculated by sampling the exhaust gas signal AS every 20 ms in the period from T1 to T2, and subtracting from each sampled exhaust gas signal the most recently ascertained mean exhaust gas value ASM. The result is a differential value $$DF = AS(t) - ASM$$

where t indicates the moment of the sampling.

The differential values DF of a time period (T2-T1) are then added together as a differential sum DS.

The differential area FS can be calculated by the following formula:

$$FS = \frac{DS}{T2 - T1}.$$

The differential area FS is compared after every time period (T2-T1) with a threshold value SW. The threshold value SW has been ascertained beforehand by tests and stored in the memory 7, preferably as a function of the load LM and the speed N (rpm) of the engine. The threshold value SW is preferably corrected as a function of the catalytic converter temperature, the correction factors having been stored in a table in the memory 7 as a function of the catalytic converter temperature $T_{cat}$.

If the differential area FS is greater than the stored threshold value SW, then the control unit 6 stores a corresponding error indication in the memory 7 and/or a corresponding signal is sent to the driver of the motor vehicle via the display 18.

In a simple embodiment of the novel process, the differential sum DS is compared directly with a corresponding comparison value, and a poor conversion capacity of the catalytic converter 4 is determined if the differential sum DS is greater than the corresponding comparison value. The corresponding comparison value is ascertained experimentally by bench tests, for instance.

An improvement in the method is attained by averaging the differential area FS over a plurality of time periods before performing a comparison with the threshold value that represents a comparison value.

The following conditions must preferably be met for an advantageous evaluation of the exhaust gas signal AS:

The lambda control must be active;

the engine must have a predetermined operating temperature;

once a controlled mixture enrichment has elapsed, there must first be a weight until a predetermined air mass threshold is exceeded;

the vehicle speed must be within a predetermined range;

the engine must be operating in a quasi-steady state in a predetermined load and rpm range; and the catalytic converter temperature must be within a predetermined temperature range.

A monitoring cycle for increasing the accuracy of the method will preferably be used to assess the catalytic converter efficiency only if at least one of the following conditions are adhered to:

The exhaust gas signal AS must exceed the mean value ASM at least once during the time period T2-T1;

the mean value ASM measured during the time period T2-T1 must be within a predetermined range;

the difference between the mean value ASM used for evaluating the amplitude signal AS and the mean value ASM calculated during the last time period must not exceed a predetermined threshold.

The predetermined threshold is preferably 10% of the last mean value ASM.

The accuracy of the system is further increased is a quotient is formed between the signal area FS of a time period T2-T1 and the comparison threshold SW, in accordance with the following formula:

$$ASQ = \frac{FS}{SW}.$$

The exhaust gas signal AS is evaluated over a predetermined number N of periods; for each period, a counter value stored in the memory 7 is incremented upward.

The exhaust gas quotients ASQ(i) of the predetermined number Z are added together to form a total exhaust gas quotient ASQS, in accordance with the following formula:

$$ASQS = \sum_{i=1}^{Z} ASQ(i)$$

Over the predetermined number Z of time periods in which the exhaust gas signal AS has been evaluated, the total exhaust gas quotient ASQS is standardized by the following formula and designated as a diagnostic signal DS:

$$DS = \frac{ASQS}{Z}.$$

The assessment of the conversion capacity of the catalytic converter is further improved if the diagnostic signal DS is compared with a predetermined diagnostic threshold SWD. The diagnostic threshold SWD is preferably also dependent on the load and/or rpm of the engine 1 and/or the temperature of the catalytic converter 4. Preferably, the diagnostic signal DS is compared with the diagnostic threshold SWD whenever the number of evaluated time periods for the amplitude signal AS exceeds a predetermined number.

In a simple version, the total exhaust gas quotient ASQS is compared directly with a corresponding comparison value, which by way of example has been ascertained experimentally.

The control unit 6 enters an error in the memory 7, or outputs an alarm signal via the display 18, if upon comparison of the diagnostic signal DS with the diagnostic threshold SWD, the diagnostic signal DS is greater than the diagnostic threshold SWD.

After a comparison of the diagnostic signal DS with the diagnostic threshold SWD, the counter Z is reset to zero. The diagnostic threshold SWD and the threshold value SW are stored in the memory in the form of two-dimensional or one-dimensional fields.

We claim:

1. A method of monitoring a conversion capacity of a catalytic converter of an internal combustion engine, the engine having lambda-controlled injection, the method which comprises:

measuring an oxygen content in an exhaust gas downstream of the catalytic converter and issuing a measurement signal;

determining a mean value of the measurement signal for a predetermined time period;

calculating a measure for an area bounded by the mean value of the measurement signal and by the measurement signal during the predetermined time period;

comparing the measure for the area with a comparison value and deducing a poor conversion capacity of the catalytic converter if the measure is above a comparison value; and issuing a corresponding signal if a poor conversion capacity of the catalytic converter is found in the deducing step.

2. The method according to claim 1, which further comprises dividing the measure for the area by the time period for calculating a comparison area, and wherein the comparing step comprises comparing the comparison area with a corresponding comparison value.

3. The method according to claim 2, which further comprises averaging the comparison area over a given number of time periods, and wherein the comparing step comprises comparing an averaged comparison area with the comparison value.

4. The method according to claim 1, which comprises defining a most recent calculated mean value as a correct mean value and, in the deducing step, taking into account a newly calculated mean value only if the newly calculated mean value deviates from the correct mean value by less than a predetermined value.

5. The method according to claim 1, which further comprises forming an exhaust gas quotient by dividing the comparison area by a corresponding comparison value, and forming a total exhaust gas quotient by summing the exhaust gas quotient for a predetermined number of time periods, and comparing the total exhaust gas quotient with a corresponding comparison value, and wherein the deducing step comprises deducing the poor conversion capacity of the catalytic converter if the total exhaust gas quotient is greater than the corresponding comparison value.

6. The method according to claim 1, which comprises defining the comparison value as a function of at least one dynamic variable selected from the group consisting of a speed of the engine, a load on the engine, and a temperature of the catalytic converter.

7. The method according to claim 1, which comprises performing the calculating and comparing steps only whenever the mean value of the measurement signal is within a predetermined range of values.

8. In an exhaust gas system of an internal combustion engine with a catalytic converter and fuel injection controlled by a control unit, an apparatus for assessing a conversion capacity of the catalytic converter, comprising:
an exhaust gas sensor disposed downstream of the catalytic converter in an exhaust gas flow direction, said exhaust gas sensor measuring an oxygen concentration in the exhaust gas and generating a measurement signal;
a control device receiving the measurement signal, said control device being programmed to:
calculate from the measurement signal a mean value of the measurement signal over a predetermined time period;
ascertain a measure for an area bounded by the mean value and by the measurement signal;
compare the measure for the area with a comparison value; and
deduce a low conversion capacity of the catalytic converter if the measure for the area is greater than the comparison value;
said control device issuing a signal indicating a low conversion capacity if a low conversion capacity has been deduced.

9. The apparatus according to claim 8, wherein said control device is incorporated in the control unit for controlling the fuel injection of the engine.

10. The apparatus according to claim 8, wherein said the control device is programmed to average the measure for the area over a plurality of predetermined time periods, and to compare the averaged area with the comparison value.

11. The apparatus of claim 8, wherein the control device is further programmed to calculate the measure for the area only if the mean value of the measurement signal deviates from a most recently evaluated mean value by no more than a predetermined amount.

* * * * *